(12) United States Patent
Si et al.

(10) Patent No.: US 12,133,193 B2
(45) Date of Patent: Oct. 29, 2024

(54) NON-CONNECTED-STATE UPLINK POSITIONING METHOD AND DEVICES

(71) Applicant: VIVO MOBILE COMMUNICATION CO., LTD., Dongguan (CN)

(72) Inventors: Ye Si, Dongguan (CN); Wei Bao, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 475 days.

(21) Appl. No.: 17/366,018

(22) Filed: Jul. 1, 2021

(65) Prior Publication Data
US 2021/0337501 A1    Oct. 28, 2021

Related U.S. Application Data

(63) Continuation of application No. PCT/CN2019/122660, filed on Dec. 3, 2019.

(30) Foreign Application Priority Data

Jan. 4, 2019    (CN) .......................... 201910009022.7

(51) Int. Cl.
*H04W 64/00* (2009.01)
*H04W 4/021* (2018.01)
(Continued)

(52) U.S. Cl.
CPC ......... *H04W 64/006* (2013.01); *H04W 4/021* (2013.01); *H04W 8/08* (2013.01); *H04W 24/10* (2013.01)

(58) Field of Classification Search
CPC ..... H04W 64/006; H04W 4/021; H04W 8/08; H04W 24/10
See application file for complete search history.

(56) References Cited

U.S. PATENT DOCUMENTS

2005/0220069 A1*  10/2005  Li  .......................... H04W 76/10
                                                             370/349
2010/0323719 A1*  12/2010  Jen ........................ H04W 64/00
                                                             455/456.1
(Continued)

FOREIGN PATENT DOCUMENTS

| CN | 101656912 A | 2/2010 |
| CN | 102573060 A | 7/2012 |

(Continued)

OTHER PUBLICATIONS

International Search Report issued in corresponding International Application No. PCT/CN2019/122660, mailed Mar. 4, 2020, 5 pages.

(Continued)

*Primary Examiner* — Ernest G Tacsik
(74) *Attorney, Agent, or Firm* — IPX PLLC

(57) ABSTRACT

Embodiments of this application disclose a non-connected-state uplink positioning method and devices. The method includes receiving first configuration information. The first configuration information is used to indicate a first uplink positioning resource when the terminal device is in a non-connected state. The method further includes when the terminal device enters the non-connected state, sending a first uplink positioning signal via the first uplink positioning resource, so that a positioning server can determine a location of the terminal device according to measurement information in the first uplink positioning signal.

18 Claims, 4 Drawing Sheets

(51) Int. Cl.
*H04W 8/08* (2009.01)
*H04W 24/10* (2009.01)

(56) References Cited

U.S. PATENT DOCUMENTS

| | | | | |
|---|---|---|---|---|
| 2011/0134827 A1* | 6/2011 | Hooli | H04W 48/08 | 370/329 |
| 2011/0263258 A1* | 10/2011 | Soliman | H04W 36/04 | 455/436 |
| 2011/0293028 A1* | 12/2011 | Panicker | H04J 11/005 | 375/260 |
| 2014/0119276 A1* | 5/2014 | Boudreau | H04L 1/0076 | 370/328 |
| 2016/0211980 A1* | 7/2016 | Zhu | H04W 72/30 | |
| 2016/0302153 A1* | 10/2016 | Martin | H04W 76/27 | |
| 2017/0311369 A1* | 10/2017 | Chiba | H04W 76/15 | |
| 2018/0054796 A1* | 2/2018 | Edge | H04W 4/029 | |
| 2018/0352488 A1* | 12/2018 | Selvaganapathy | H04W 36/28 | |
| 2019/0090293 A1* | 3/2019 | Su | H04W 76/14 | |
| 2019/0182794 A1* | 6/2019 | Wong | H04W 52/0216 | |
| 2019/0349881 A1* | 11/2019 | Choi | H04W 76/27 | |
| 2020/0015169 A1* | 1/2020 | Maganti | H04W 52/0235 | |
| 2020/0068340 A1* | 2/2020 | Rasanen | H04W 4/20 | |
| 2020/0118101 A1* | 4/2020 | Griffin | H04W 4/80 | |
| 2020/0252958 A1* | 8/2020 | Lu | H04W 4/00 | |
| 2020/0396710 A1* | 12/2020 | Wigren | H04W 24/10 | |
| 2021/0204088 A1* | 7/2021 | Ferreira | G01S 5/017 | |

FOREIGN PATENT DOCUMENTS

| | | |
|---|---|---|
| CN | 103621138 A | 3/2014 |
| CN | 104980888 A | 10/2015 |
| CN | 107959971 A | 4/2018 |
| WO | 2009135931 A1 | 11/2009 |
| WO | 2010075803 A1 | 7/2010 |

OTHER PUBLICATIONS

First Office Action issued in related Chinese application No. 201910009022.7, mailed Oct. 12, 2020, 11 pages.

Qualcomm Incorporated, "NG-RAN Positioning Architecture and Procedures" 3GPP TSG-RAN WG2 Meeting #104 R2-1817898, Nov. 2018.

Ericsson, "RAT dependent NR positioning solutions" 3GPP TSG-RAN WG1 #104 R2-1817739, Nov. 2018.

Qualcomm Incorporated, "Combined Downlink and Uplink NR Positioning Procedures", 3GPP TSG-RAN WG2 Meeting #104, R2-1817899, Nov. 2018.

* cited by examiner

NON-CONNECTED-STATE UPLINK POSITIONING METHOD AND DEVICES

CROSS-REFERENCE TO RELATED APPLICATION

This application is a bypass continuation of PCT Application No. PCT/CN2019/122660 filed Dec. 3, 2019, which claims priority to Chinese Patent Application No. 201910009022.7 filed in China on Jan. 4, 2019, both of which are incorporated herein by reference in their entireties.

TECHNICAL FIELD

Embodiments of this application relate to the field of communications technologies, and in particular, to a non-connected-state uplink positioning method and devices.

BACKGROUND

In a Long Term Evolution (LTE) system, a terminal device supports an idle state and a connected state. In a New Radio (NR) system, the terminal device supports the idle state, an inactive state, and the connected state. States other than the connected state, such as the idle state and the inactive state, may also be referred to as a non-connected state.

In related technologies, the terminal device can be positioned only when it is in the connected state. In some scenarios, some applications in the terminal device may need location information updates. If the terminal device is in a non-connected state in a location information update process, the terminal device needs to enter the connected state to complete a positioning procedure. If location information in these applications needs to be updated frequently, power consumption of the terminal device may be increased because the terminal device needs to enter the connected state each time when the location information is updated, which goes against energy conservation of the terminal device.

SUMMARY

Embodiments of this application aim to provide a non-connected-state uplink positioning method and devices, to resolve a problem that when a terminal device is in a non-connected state, it needs to enter a connected state each time when positioning is required, which goes against energy conservation of the terminal device.

According to a first aspect, a non-connected-state uplink positioning method is provided, where the method is executed by a terminal device, and the method includes:

receiving first configuration information, where the first configuration information is used to indicate a first uplink positioning resource when the terminal device is in a non-connected state; and when the terminal device enters the non-connected state, sending a first uplink positioning signal via the first uplink positioning resource, so that a positioning server can determine a location of the terminal device according to measurement information in the first uplink positioning signal.

According to a second aspect, a non-connected-state uplink positioning method is provided, where the method is executed by a network device, and the method includes:

sending first configuration information, where the first configuration information is used to indicate a first uplink positioning resource when a terminal device is in a non-connected state, so that the terminal device can send a first uplink positioning signal via the first uplink positioning resource when in the non-connected state, and the first uplink positioning signal is used by a positioning server for determining a location of the terminal device.

According to a third aspect, a non-connected-state uplink positioning method is provided, where the method is executed by a positioning server, and the method includes:

sending instruction information, where the instruction information is used to instruct a network device to send first configuration information to a terminal device, and the first configuration information is used to indicate a first uplink positioning resource when the terminal device is in a non-connected state; and determining a location of the terminal device according to measurement information in a first uplink positioning signal.

According to a fourth aspect, a terminal device is provided, where the terminal device includes:

a receiving module, configured to receive first configuration information, where the first configuration information is used to indicate a first uplink positioning resource when the terminal device is in a non-connected state; and a sending module, configured to: when the terminal device enters the non-connected state, send a first uplink positioning signal via the first uplink positioning resource, so that a positioning server can determine a location of the terminal device according to measurement information in the first uplink positioning signal.

According to a fifth aspect, a network device is provided, where the network device includes:

a sending module, configured to send first configuration information, where the first configuration information is used to indicate a first uplink positioning resource when a terminal device is in a non-connected state, so that the terminal device can send a first uplink positioning signal via the first uplink positioning resource when in the non-connected state, and the first uplink positioning signal is used by a positioning server for determining a location of the terminal device.

According to a sixth aspect, a positioning server is provided, where the positioning server includes:

a sending module, configured to send instruction information, where the instruction information is used to instruct a network device to send first configuration information to a terminal device, and the first configuration information is used to indicate a first uplink positioning resource when the terminal device is in a non-connected state; and a positioning module, configured to determine a location of the terminal device according to measurement information in a first uplink positioning signal.

According to a seventh aspect, a terminal device is provided, including: a processor, a memory, and a computer program stored in the memory and executable on the processor, where when the computer program is executed by the processor, the steps of the method provided in the first aspect are implemented.

According to an eighth aspect, a network device is provided, including: a processor, a memory, and a computer program stored in the memory and executable on the processor, where when the computer program is executed by the processor, the steps of the method provided in the second aspect are implemented.

According to a ninth aspect, a positioning server is provided, including: a processor, a memory, and a computer program stored in the memory and executable on the processor, where when the computer program is executed by the processor, the steps of the method provided in the third aspect are implemented.

According to a tenth aspect, a computer-readable storage medium is provided, where the computer-readable storage medium stores a computer program, and when the computer program is executed by a processor, the steps of the method provided in the first to third aspects are implemented.

In the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

To make the objectives, technical solutions, and advantages of this application clearer, the following clearly and completely describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application.

It should be understood that the technical solutions in the embodiments of this application can be applied to various communications systems, such as a Global System for Mobile Communications (GSM) system, a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system, a Universal Mobile Telecommunications System (UMTS) or a Worldwide Interoperability for Microwave Access (WiMAX) communications system, a 5G system (also referred to as an NR system), or a subsequent evolution communications system.

In the embodiments of this application, a terminal device may include but not limited to a Mobile Station (MS), a Mobile Terminal, a mobile phone, User Equipment (UE), a handset, portable equipment, a vehicle, and the like. The terminal device may communicate with one or more core networks by using a Radio Access Network (RAN). For example, the terminal device may be a mobile phone (also referred to as a "cellular" phone), or a computer having a wireless communication function; or the terminal device may be a portable, pocket-sized, handheld, computer built-in, or in-vehicle mobile apparatus.

In the embodiments of this application, a network device is an apparatus that is deployed in the radio access network and that is used to provide a wireless communication function for the terminal device. The network device may be a base station, and the base station may include various types of macro base stations, micro base stations, relay nodes, access points, and the like. In systems using different radio access technologies, names of devices having a base station function may be different. For example, what is called an evolved NodeB (evolved NodeB, eNB or eNodeB) in an LTE network is called a Node B in a 3rd Generation (3G) network, or a network device in a subsequent evolution communications system, but the wording does not constitute a restriction.

Figure 1:
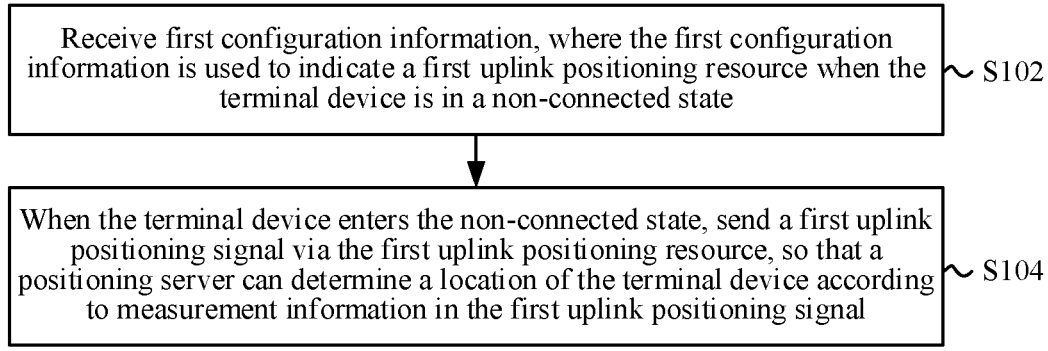
FIG. 1 is a schematic flowchart of a non-connected-state uplink positioning method according to an embodiment of this application.

As shown in FIG. 1, an embodiment of this application provides a non-connected-state uplink positioning method 100. The method may be executed by a terminal device, and includes the following steps.

S102: Receive first configuration information, where the first configuration information is used to indicate a first uplink positioning resource when the terminal device is in a non-connected state.

The non-connected state in the embodiments of this application may be states, other than a connected state, of the terminal device. Specifically, for example, in an LTE system, the non-connected state includes an idle state; and in an NR system, the non-connected state includes an inactive state and an idle state. Certainly, in a subsequent evolution communications system, the non-connected state may further include other states different from the idle state and the inactive state.

In this step, the terminal device may receive, in the connected state, the first configuration information from a network device. The first configuration information may be used to indicate an uplink positioning resource when the terminal device is in the non-connected state.

Optionally, the first configuration information may also indicate the first uplink positioning resource when the terminal device is in the first preset area and the non-connected state, that is, when the terminal device is in the first preset area, the first configuration information is valid. The foregoing first preset area may be one cell or one group of cells, for example, a plurality of cells in a cell list, and may alternatively be another preset area or the like.

The foregoing uplink positioning resource may be a random access preamble resource, a Sounding Reference Signal (SRS) resource, or an uplink positioning reference signal resource newly defined in NR.

Optionally, the foregoing uplink positioning resource is periodic. The size (also called length) of the period may be determined according to positioning requirements of the terminal device. It may be understood that the smaller the period is, the more timely the location information of the terminal device is obtained; and the larger the period is, the better the resource conservation is facilitated due to reduction of overheads such as uplink positioning signals and uplink positioning resources.

It should be noted that "first" in "first configuration information", "first preset area" and "first uplink positioning signal" mentioned herein is merely used to differentiate from "second configuration information", "second preset area", "second uplink positioning signal" and the like that will be mentioned subsequently, and does not indicates other specific meanings.

S104: When the terminal device enters the non-connected state, send a first uplink positioning signal via the first uplink positioning resource, so that a positioning server can determine a location of the terminal device according to measurement information in the first uplink positioning signal.

In step S102, the terminal device is in the connected state when receiving the first configuration information. For the purpose of power conservation, the terminal device may be switched from the connected state to the non-connected state. When the terminal device enters the non-connected state, the terminal device can send the first uplink positioning signal via the first uplink positioning resource indicated by the first configuration information.

As mentioned above, the uplink positioning resource indicated by the first configuration information may be a preamble resource, an SRS resource or an uplink positioning reference signal resource newly defined in NR. Correspondingly, the first uplink positioning signal sent by the terminal device may be a preamble code, an SRS, or an uplink positioning reference signal newly defined in NR.

Therefore, devices (may be at least three) that participate in positioning, such as a gNB, an eNB, a Location Measurement Unit (LMU), and/or the like, can receive the foregoing first uplink positioning signal, process the received first uplink positioning signal according to the first configuration information, and send a processing result to the positioning server. Then, the positioning server can calculate the location of the terminal device. In an LTE system, the positioning server is an Enhanced Serving Mobile Location Center (E-SMLC); and in an NR system, the positioning server is a Location Management Function (LMF) or another positioning entity.

According to the non-connected-state uplink positioning method provided in the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

Based on the foregoing embodiment, optionally, the first configuration information received in step S102 may be used to indicate the first uplink positioning resource when the terminal device is in a first preset area and the non-connected state, that is, the first configuration information is valid when the terminal device is in the first preset area. When the terminal device is moved out of the first preset area, another uplink positioning resource may be configured for the terminal device.

Therefore, the foregoing embodiment may further include the following step: when it is detected that the terminal device is moved out of the first preset area, establishing an RRC connection with the network device, so as to determine a location of the terminal device in the connected state.

The determining a location of the terminal device in the connected state may be implemented using an uplink positioning method, a downlink positioning method, or another positioning method.

The reason why the location of the terminal device in the connected state needs to be determined is that the terminal device is moved out of the first preset area. It is assumed that the terminal device enters a second preset area. Optionally, after a positioning process in the connected state ends, the method may further include the following steps:

receiving second configuration information in the second preset area, where the second configuration information is used to indicate a second uplink positioning resource when the terminal device is in the second preset area and the non-connected state; and when the terminal device enters the non-connected state, sending a second uplink positioning signal via the second uplink positioning resource, so that the positioning server can determine a location of the terminal device according to the second uplink positioning signal.

The foregoing second preset area may be one cell or one group of cells, for example, a plurality of cells in a cell list, and may alternatively be another preset area or the like.

Optionally, after the sending a second uplink positioning signal via the second uplink positioning resource, the method may further include the following step: when it is detected that the terminal device is moved out of the second preset area, establishing an RRC connection with the network device, so as to determine a location of the terminal device in the connected state. Certainly, when the terminal device is in the connected state, another uplink positioning resource may be allocated to the terminal device based on an area to which it is moved, thereby positioning the terminal device in the non-connected state.

Optionally, after the positioning process in the connected state ends, the method may further include the following step: releasing the first uplink positioning resource.

As mentioned above, the first uplink positioning resource is valid in the first preset area. After the terminal device is moved out of the first preset area, the first uplink positioning resource is released to improve uplink positioning resource utilization.

Similarly, after the another uplink positioning resource is allocated to the terminal device based on the area to which it is moved, the method may further include the following step: releasing the second uplink positioning resource, to improve uplink positioning resource utilization.

In the embodiment shown in FIG. 1, if the first uplink positioning signal fails to be received, the terminal device cannot be positioned in the non-connected state in time.

Optionally, to position the terminal device in time, that is, to improve the positioning efficiency, in the embodiment shown in FIG. 1, after the first uplink positioning signal is sent via the first uplink positioning resource, when the terminal device enters the non-connected state and is in the first preset area indicated by the first configuration information, that is, the terminal device is not moved out of the first preset area, the method may further include the following step: establishing an RRC connection with the network device, so as to determine a location of the terminal device in the connected state, where the RRC connection is initiated when the network device fails to receive the first uplink positioning signal.

The determining a location of the terminal device in the connected state may be implemented using an uplink positioning method, a downlink positioning method, or another positioning method.

Optionally, after a positioning process in the connected state ends, the method may further include the following steps: receiving third configuration information, where the third configuration information is used to indicate a third uplink positioning resource when the terminal device is in the non-connected state; and when the terminal device enters the non-connected state, sending a third uplink positioning signal via the third uplink positioning resource.

In this embodiment, it is assumed that the terminal device is still in the first preset area indicated by the first configuration information. In this embodiment, it is considered that the terminal device is switched cyclically between the connected state and the non-connected state. Therefore, each time the terminal device is in the connected state, an uplink positioning resource is configured for the terminal device and is used when the terminal device enters the non-connected state next time, thereby positioning of the terminal device in the non-connected state. Certainly, in another embodiment, uplink positioning resources may be configured for the terminal device in the connected state and be used when the terminal device enters the non-connected state for a plurality of consecutive subsequent times.

Optionally, after the positioning process in the connected state ends, the method may further include the following step: releasing the first uplink positioning resource.

Similarly, after the sending a third uplink positioning signal via the third uplink positioning resource, the method may further include the following step: releasing the third uplink positioning resource, to improve uplink positioning resource utilization.

Optionally, in the foregoing embodiments, the first configuration information is sent by the network device, and the positioning server determines that the terminal device supports non-connected-state uplink positioning. Therefore, in step S102, before the receiving first configuration information, the method may further include the following steps:

receiving capability request information, where the capability request information may be sent by the positioning server; and sending capability information to the positioning server, where the capability information is used by the positioning server for determining whether the terminal device supports non-connected-state uplink positioning.

The foregoing describes the non-connected-state uplink positioning method according to this embodiment of this application in detail with reference to FIG. 1. The following describes a non-connected-state uplink positioning method according to another embodiment of this application in detail with reference to FIG. 2. It may be understood that the interaction between the network device and the terminal device described on the network device side is the same as that described on the terminal device side in the method shown in FIG. 1. To avoid repetition, relevant descriptions are appropriately omitted.

Figure 2:
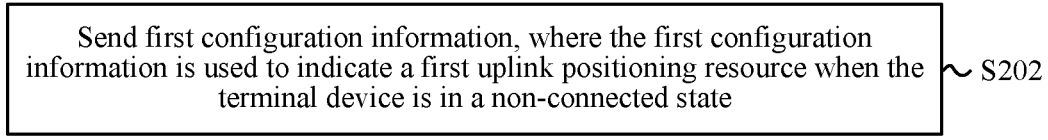
FIG. 2 is a schematic flowchart of a non-connected-state uplink positioning method according to another embodiment of this application.

FIG. 2 is a schematic flowchart of a non-connected-state uplink positioning method according to an embodiment of this application. The method can be applied on the network device side. As shown in FIG. 2, the method 200 includes:

S202: Send first configuration information, where the first configuration information is used to indicate a first uplink positioning resource when the terminal device is in a non-connected state.

In this embodiment, the terminal device sends a first uplink positioning signal via the first uplink positioning resource when in the non-connected state, and the first uplink positioning signal is used by a positioning server for determining a location of the terminal device.

According to the non-connected-state uplink positioning method provided in the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

Optionally, as an embodiment, the first configuration information is used to indicate the first uplink positioning resource when the terminal device is in a first preset area and the non-connected state, and after the sending first configuration information, the method further includes:

establishing an RRC connection with the terminal device, so as to determine a location of the terminal device in the connected state, where the RRC connection is initiated when the terminal device is moved out of the first preset area.

Optionally, as an embodiment, after a positioning process in the connected state ends, the method further includes:

sending second configuration information, where the second configuration information is used to indicate a second uplink positioning resource when the terminal device is in a second preset area and the non-connected state, so that the terminal device can send a second uplink positioning signal via the second uplink positioning resource when in the non-connected state.

Optionally, as an embodiment, after the sending second configuration information, the method further includes:

establishing an RRC connection with the terminal device, so as to determine a location of the terminal device in the connected state, where the RRC connection is initiated when the terminal device is moved out of the second preset area.

Optionally, as an embodiment, after the sending first configuration information, the method further includes:

if the first uplink positioning signal fails to be received, establishing an RRC connection with the terminal device, so as to determine a location of the terminal device in a connected state.

Optionally, as an embodiment, after a positioning process in the connected state ends, the method further includes:

sending third configuration information, where the third configuration information is used to indicate a third uplink positioning resource when the terminal device is in the non-connected state, so that the terminal device can send a third uplink positioning signal via the third uplink positioning resource when in the non-connected state.

Optionally, as an embodiment, the uplink positioning resources are periodic.

The foregoing describes the non-connected-state uplink positioning methods according to the embodiments of this application in detail with reference to FIG. 1 and FIG. 2. The following describes a non-connected-state uplink positioning method according to an embodiment of this application in detail with reference to FIG. 3. It may be understood that the interaction in the positioning process described on the positioning server side is the same as that described in the methods shown in FIG. 1 and FIG. 2. To avoid repetition, relevant descriptions are appropriately omitted.

Figure 3:
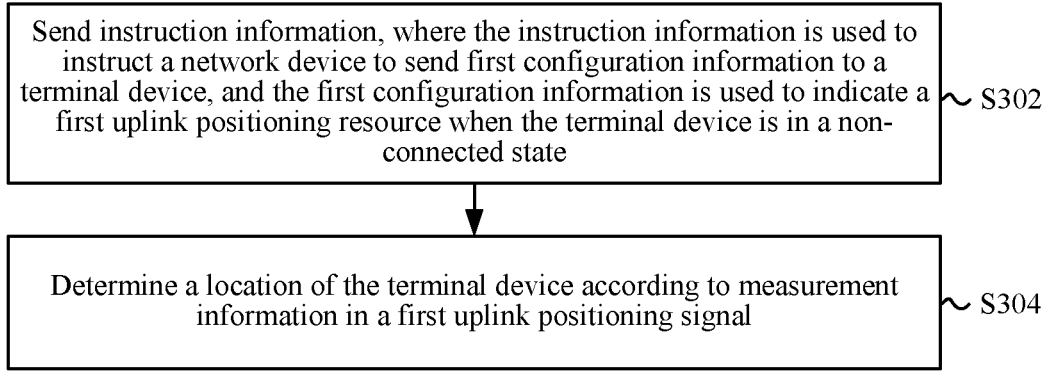
FIG. 3 is a schematic flowchart of a non-connected-state uplink positioning method according to still another embodiment of this application.

FIG. 3 is a schematic flowchart of a non-connected-state uplink positioning method according to an embodiment of this application. The method can be applied on the positioning server side. As shown in FIG. 3, the method 300 includes:

S302: Send instruction information, where the instruction information is used to instruct a network device to send first configuration information to a terminal device, and the first configuration information is used to indicate a first uplink positioning resource when the terminal device is in a non-connected state; and S304: Determine a location of the terminal device according to measurement information in a first uplink positioning signal.

In the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

Optionally, as an embodiment, before the sending instruction information, the method further includes:

sending capability request information; and receiving capability information for determining whether the terminal device supports non-connected-state uplink positioning, where the sending instruction information includes: sending the instruction information when it is determined that the terminal device supports non-connected-state uplink positioning.

Optionally, as an embodiment, the uplink positioning resource is periodic.

Figure 4:
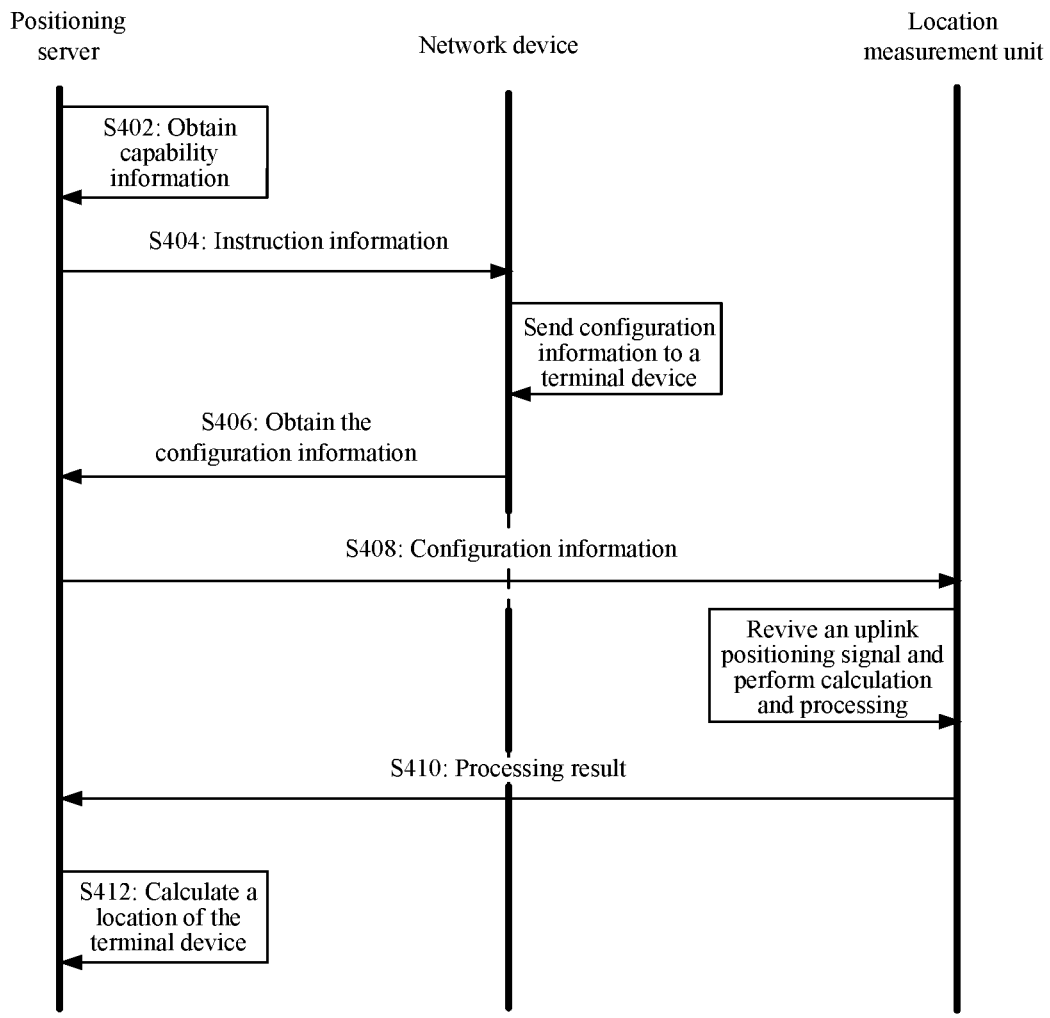
FIG. 4 is a schematic flowchart of a non-connected-state uplink positioning method according to yet another embodiment of this application.

To describe the non-connected-state uplink positioning method provided in the embodiments of this application in detail, the following uses a specific embodiment. As shown in FIG. 4, the method 400 includes the following steps.

S402: Request, by a positioning server, capability information of a terminal device via a signaling message when the terminal device is in a connected state; send, by the terminal device, the capability information to the positioning server via another signaling message; and determine, by the positioning server, whether the terminal device supports non-connected-state uplink positioning according to the capability information of the terminal device.

If the terminal device supports non-connected-state uplink positioning, perform step S404.

If the terminal device does not support non-connected-state uplink positioning, perform positioning in a normal mode when the terminal enters a connected state.

S404: Instruct, by the positioning server according to the capability information of the terminal device, a network device (for example, a gNB or an eNB) to configure periodic uplink positioning resources for the terminal device that are valid in preset areas; instruct the terminal device to periodically send uplink positioning signals when in the non-connected state; and instruct the terminal device to establish an RRC connection with the network device when the terminal device is moved out of the preset areas.

Therefore, when the terminal device is in the connected state, the network device can send configuration information to the terminal device. The configuration information is used to indicate an uplink positioning resource when the terminal device is in the preset area and non-connected-state; and the terminal device can receive the configuration information sent by the network device.

The foregoing preset area may be one cell or one group of cells, for example, a plurality of cells in a cell list, and may alternatively be another preset area or the like.

S406: Obtain, by the positioning server, the foregoing configuration information from the network device (for example, a gNB or an eNB) via a signaling message (for example, an LPPa).

S408: Send, by the positioning server via a signaling message, the configuration information to other gNBs, eNBs, LMUs, or the like that participate in positioning in the current area. FIG. 4 shows only a process of sending the configuration information to an LMU, but does not impose any specific limitation.

The terminal device enters an inactive state or idle state at a moment before or after that time. According to the foregoing configuration information, when in the inactive state or idle state and in the preset area indicated by the configuration information, the terminal device periodically sends uplink positioning signals.

S410: Receive, by the gNBs, eNBs, or LMUs that participate in positioning, the uplink positioning signal; process the uplink positioning signal according to the configuration information received from the positioning server; and send a processing result to the positioning server.

S412: Calculate, by the positioning server, a location of the terminal device.

Optionally, in step S410, if the uplink positioning signal fails to be received, the gNBs, eNBs, or LMUs establish RRC connections with the terminal device to position the terminal device in the connected state. Then, the positioning server instructs gNBs or eNBs serving the terminal device to configure a new uplink positioning resource for the terminal device, and instruct the original serving gNBs or eNBs to release the original uplink positioning resource.

Optionally, when the terminal device is moved out of the preset area indicated by the configuration information, an RRC connection with the network device is established to position the terminal device in the connected state. Then, the positioning server instructs gNBs or eNBs serving a new area to configure a new uplink positioning resource for the terminal device, and instruct the original serving gNBs or eNBs to release the original uplink positioning resource.

The foregoing describes the non-connected-state uplink positioning methods according to the embodiments of this application in detail with reference to FIG. 1 to FIG. 4. The following describes a terminal device according to an embodiment of this application in detail with reference to FIG. 5.

Figure 5:
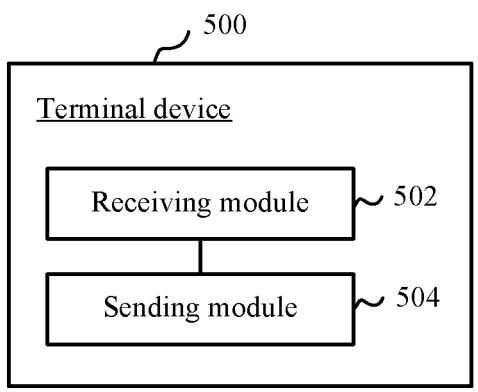
FIG. 5 is a schematic structural diagram of a terminal device according to an embodiment of this application.

FIG. 5 is a schematic structural diagram of a terminal device according to an embodiment of this application. As shown in FIG. 5, a terminal device 500 includes:

a receiving module 502, configured to receive first configuration information, where the first configuration information is used to indicate a first uplink positioning resource when the terminal device is in a non-connected state; and a sending module 504, configured to: when the terminal device enters the non-connected state, send a first uplink positioning signal via the first uplink positioning resource, so that a positioning server can determine a location of the terminal device according to measurement information in the first uplink positioning signal.

In the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

Optionally, as an embodiment, the first configuration information is used to indicate the first uplink positioning resource when the terminal device is in a first preset area and the non-connected state, and the terminal device 500 further includes a connection positioning module (not shown in the figure) that can be configured to: when it is detected that the terminal device is moved out of the first preset area, establish an RRC connection with a network device, so as to determine a location of the terminal device in a connected state.

The foregoing first preset area may be one cell or one group of cells, for example, a plurality of cells in a cell list, and may alternatively be another preset area or the like.

Optionally, as an embodiment, the receiving module 502 may be further configured to receive second configuration information in a second preset area, where the second configuration information is used to indicate a second uplink positioning resource when the terminal device is in the second preset area and the non-connected state; and the sending module 504 may be further configured to: when the terminal device enters the non-connected state, send a second uplink positioning signal via the second uplink positioning resource.

Optionally, as an embodiment, the receiving module 502 may be further configured to release the first uplink positioning resource.

Optionally, as an embodiment, the connection positioning module (not shown in the figure) can be configured to: when it is detected that the terminal device is moved out of the second preset area, establish an RRC connection with a network device, so as to determine a location of the terminal device in the connected state.

Optionally, as an embodiment, the receiving module 502 may be further configured to establish an RRC connection with the network device, so as to determine a location of the terminal device in the connected state, where the RRC connection is initiated when the network device fails to receive the first uplink positioning signal.

Optionally, as an embodiment, the receiving module 502 may be further configured to: receive third configuration information, where the third configuration information is used to indicate a third uplink positioning resource when the terminal device is in the non-connected state; and the sending module 504 may be further configured to: when the terminal device enters the non-connected state, send a third uplink positioning signal via the third uplink positioning resource.

Optionally, as an embodiment, the receiving module 502 may be further configured to release the first uplink positioning resource.

Optionally, as an embodiment, the first configuration information is sent by the network device; the positioning server determines that the terminal device supports non-connected-state uplink positioning; the receiving module 502 may be further configured to receive capability request information; and the sending module 504 may be further configured to send capability information, where the capability information is used by the positioning server for determining whether the terminal device supports non-connected-state uplink positioning.

Optionally, as an embodiment, the uplink positioning resources are periodic.

For the terminal device 500 according to this embodiment of this application, reference may be made to the corresponding procedures of the methods 100, 200, 300, and 400 according to the embodiments of this application, and each unit/module in and the foregoing other operations and/or functions of the terminal device 500 are used to implement the corresponding procedures of the methods 100, 200, 300, and 400, and will no longer be described herein for the purpose of brevity.

Figure 6:
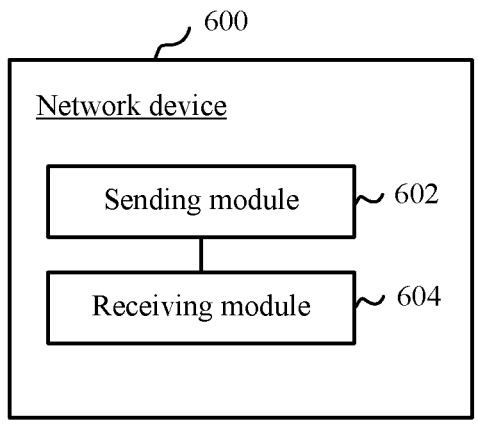
FIG. 6 is a schematic structural diagram of a network device according to an embodiment of this application.

FIG. 6 is a schematic structural diagram of a network device according to an embodiment of this application. As shown in FIG. 6, the network device 600 includes:

a sending module 602, configured to send first configuration information, where the first configuration information is used to indicate a first uplink positioning resource when a terminal device is in a non-connected state, so that the terminal device can send a first uplink positioning signal via the first uplink positioning resource when in the non-connected state, and the first uplink positioning signal is used by a positioning server for determining a location of the terminal device.

In the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

Optionally, as an embodiment, the first configuration information is used to indicate the first uplink positioning resource when the terminal device is in a first preset area and the non-connected state, and the network device 600 further includes a receiving module 604 that can be configured to establish an RRC connection with the terminal device, so as to determine a location of the terminal device in the connected state, where the RRC connection is initiated when the terminal device is moved out of the first preset area.

Optionally, as an embodiment, the sending module 602 may be further configured to send second configuration information, where the second configuration information is used to indicate a second uplink positioning resource when the terminal device is in a second preset area and the non-connected state, so that the terminal device can send a second uplink positioning signal via the second uplink positioning resource when in the non-connected state.

Optionally, as an embodiment, the receiving module 604 may be further configured to establish an RRC connection with the terminal device, so as to determine a location of the terminal device in the connected state, where the RRC connection is initiated when the terminal device is moved out of the second preset area.

Optionally, as an embodiment, the sending module 602 may be further configured to: if the first uplink positioning signal fails to be received, establish an RRC connection with the terminal device, so as to determine a location of the terminal device in the connected state.

Optionally, as an embodiment, the sending module 602 may be further configured to send third configuration information, where the third configuration information is used to indicate a third uplink positioning resource when the terminal device is in the non-connected state, so that the terminal device can send a third uplink positioning signal via the third uplink positioning resource when in the non-connected state.

Optionally, as an embodiment, the uplink positioning resources are periodic.

For the network device 600 according to this embodiment of this application, reference may be made to the corresponding procedures of the methods 200, 300, and 400 according to the embodiments of this application, and each unit/module in and the foregoing other operations and/or functions of the network device 600 are used to implement the corresponding procedures of the methods 200, 300, and 400, and will no longer be described here for the purpose of brevity.

Figure 7:
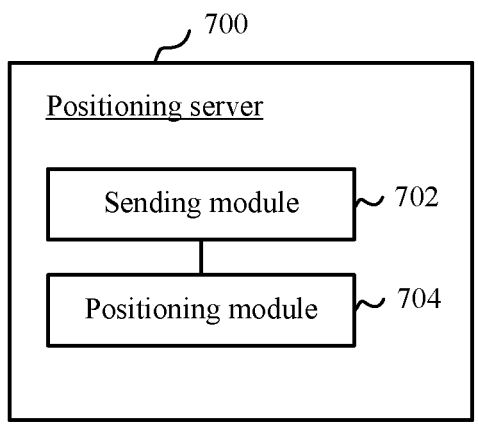
FIG. 7 is a schematic structural diagram of a positioning server according to an embodiment of this application.

FIG. 7 is a schematic structural diagram of a positioning server according to an embodiment of this application. As shown in FIG. 7, a positioning server 700 includes:

a sending module 702, configured to send instruction information, where the instruction information is used to instruct a network device to send first configuration information to a terminal device, and the first configuration information is used to indicate a first uplink positioning resource when the terminal device is in a non-connected state; and a positioning module 704, configured to determine a location of the terminal device according to measurement information in a first uplink positioning signal.

In the embodiments of this application, the terminal device can receive the configuration information when in the connected state, and the configuration information indicates the uplink positioning resource when the terminal device is in the non-connected state. Therefore, the terminal device can send the uplink positioning signal via the uplink positioning resource after entering the non-connected state, and the positioning server can determine the location of the terminal device according to the measurement information in the uplink positioning signal. The terminal device can be positioned without entering the connected state, which facilitates energy conservation of the terminal device. In addition, signaling loads caused by switching between the non-connected state and the connected state are avoided, which better facilitates the energy conservation of the terminal device.

Optionally, as an embodiment, the positioning server 700 further includes a receiving module (not shown in the figure); the sending module 702 may be further configured to send capability request information; the receiving module is configured to receive capability information for determining whether the terminal device supports non-connected-state uplink positioning; and that the sending module 702 sends the instruction information includes: sending instruction information when it is determined that the terminal device supports non-connected-state uplink positioning.

Optionally, as an embodiment, the uplink positioning resources are periodic.

For the positioning server 700 according to this embodiment of this application, reference may be made to the corresponding procedures of the methods 300 and 400 in embodiments of this application, and each unit/module in and the foregoing other operations and/or functions of the positioning server 700 are used to implement the corresponding procedures of the methods 300 and 400, and will no longer be described herein for the purpose of brevity.

Figure 8:
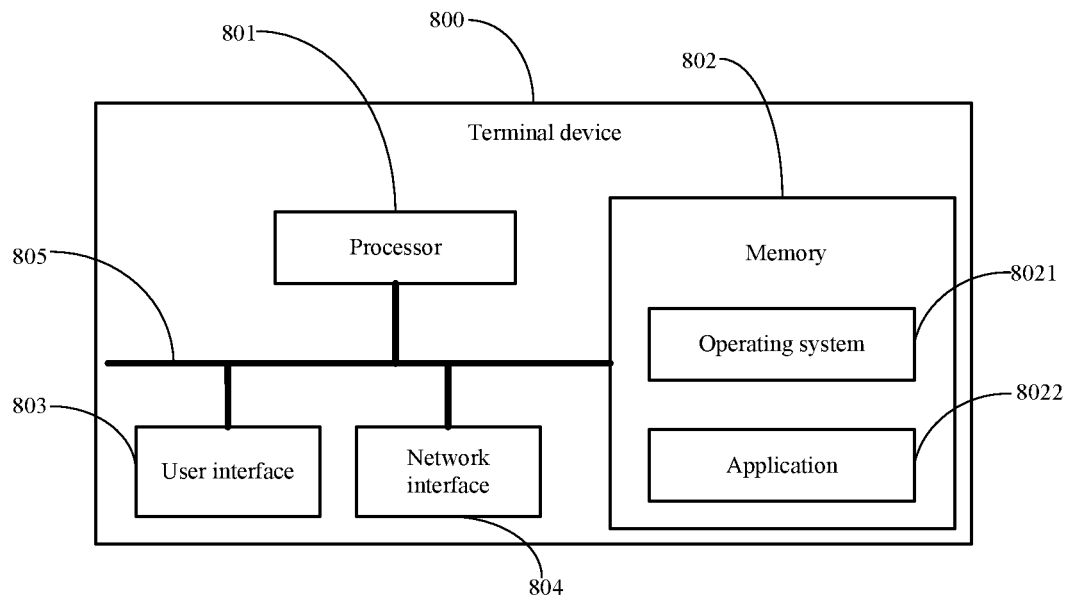
FIG. 8 is a schematic structural diagram of a terminal device according to another embodiment of this application.

FIG. 8 is a block diagram of a terminal device according to another embodiment of this application. As shown in FIG. 8, the terminal device 800 includes: at least one processor 801, a memory 802, at least one network interface 804, and a user interface 803. Various components of the terminal device 800 are coupled by using a bus system 805. It can be understood that the bus system 805 is configured to implement connection and communication between these components. In addition to a data bus, the bus system 805 may include a power bus, a control bus, and a status signal bus. However, for clear description, various buses are marked as the bus system 805 in FIG. 8.

The user interface 803 may include a display, a keyboard, or a clicking device, for example, a mouse, a trackball, a touch panel, or a touchscreen.

It can be understood that the memory 802 in this embodiment of this application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. By way of example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 802 in the system and method described in the embodiments of this application is intended to include but is not limited to these and any other suitable type of memory.

In some implementations, the memory 802 stores the following element: an executable module or a data structure, a subset thereof, or an extended set thereof: an operating system 8021 and an application program 8022.

The operating system 8021 includes various system programs, such as a framework layer, a core library layer, and a driver layer, and is configured to implement various basic services and process hardware-based tasks. The application program 8022 includes various application programs, for example, a Media Player and a Browser, and is configured to implement various application services. A program implementing the method in the embodiments of this application may be included in the application program 8022.

In this embodiment of this application, the terminal device 800 further includes: a computer program stored in the memory 802 and executable on the processor 801. When the computer program is executed by the processor 801, the steps of the following method 100 are performed.

The method disclosed in the embodiment of this application may be applied to the processor 801 or implemented by the processor 801. The processor 801 may be an integrated circuit chip having a signal processing capability. During implementation, the steps of the foregoing method can be completed by hardware integrated logic circuits in the processor 801 or indications in the form of software. The foregoing processor 801 may be a general-purpose processor, a Digital Signal Processor (DSP), an Application Specific Integrated Circuit (ASIC), a Field Programmable Gate Array (FPGA) or another programmable logic component, a discrete gate or a transistor logic component, or a discrete hardware component. The processor 801 may implement or perform the methods, steps, and logic block diagrams disclosed in the embodiments of this application. The general-purpose processor may be a microprocessor, any conventional processor, or the like. The steps of the method disclosed in the embodiments of this application may be directly performed by a hardware decoding processor or performed by a combination of hardware and software modules in a decoding processor. The software module may be located in a mature computer-readable storage medium in this field, such as a RAM, a flash memory, a ROM, a PROM or an electrically erasable programmable memory, or a register. The computer-readable storage medium is located in the memory 802, and the processor 801 reads information from the memory 802 and completes the steps of the foregoing method in combination with its hardware. Specifically, the computer readable storage medium stores a computer program, and when the computer program is executed by the processor 801, the steps of the foregoing embodiment of the method 100 are performed.

It may be understood that the embodiments described in the embodiments of this application may be implemented by hardware, software, firmware, middleware, microcode, or a combination thereof. For implementation with hardware, the processing unit may be implemented in one or more ASICs, a DSP, a DSP Device (DSPD), a proProgrammable Logic Device (PLD), a FPGA, a general-purpose processor, a controller, a microcontroller, a microprocessor, another electronic unit for implementing the functions of this application, or a combination thereof.

For implementation by software, technologies described in the embodiments of this application may be implemented by executing function modules (for example, a process and a function) in the embodiments of this application. Software codes may be stored in the memory and executed by the processor. The memory may be implemented inside or outside the processor.

The terminal device 800 can implement each process implemented by the terminal device in the foregoing embodiments. To avoid repetition, details are not described herein again.

Figure 9:
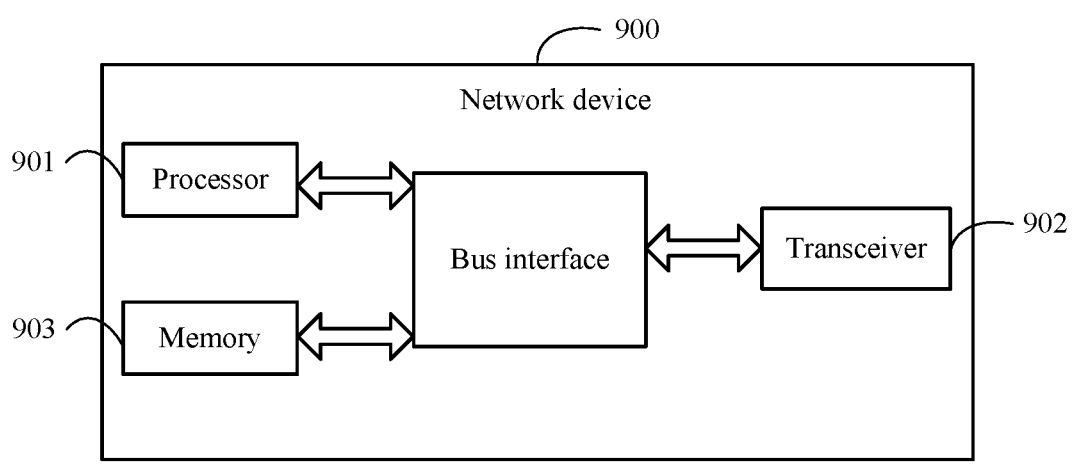
FIG. 9 is a schematic structural diagram of a network device according to another embodiment of this application.

Referring to FIG. 9 which is a structural diagram of a network device applied in this embodiment of this application, the network device can implement details of the embodiment of a method 500, and achieve a same effect. As shown in FIG. 9, the network device 900 includes: a processor 901, a transceiver 902, a memory 903, and a bus interface.

In this embodiment of this application, the network device 900 further includes: a computer program stored in the memory 903 and executable on the processor 901. When the computer program is executed by the processor 901, the steps of the method 200 are performed.

In FIG. 9, a bus architecture can include any quantity of interconnected buses and bridges, which are specifically connected together by circuits of one or more processors represented by the processor 901 and a memory represented by the memory 903. The bus architecture may further link various other circuits such as those of a peripheral device, a voltage regulator, and a power management circuit. These are well known in the art, and therefore are not further described in this specification. The bus interface provides an interface. The transceiver 902 may include multiple elements, that is, include a transmitter and a receiver, and provide units for communication with various other apparatuses on a transmission medium.

The processor 901 is responsible for management of the bus architecture and general processing. The memory 903 may store data used by the processor 901 when operations are performed.

An embodiment of the application further provides a computer-readable storage medium. The computer-readable storage medium stores a computer program, and when executing the computer program, a processor implements the foregoing processes of the foregoing embodiments of the methods 100 and 200 and a same technical effect can be achieved. To avoid repetition, details are not described herein again. The computer readable storage medium may be a ROM, a RAM, a magnetic disk, a compact disc, or the like.

It should be noted that the terms "include", "comprise" or any other variants thereof herein are intended to cover a non-exclusive inclusion, so that a process, a method, an article or equipment that includes a list of elements includes not only those elements, but also another element not expressly listed, or an element inherent to such a process, a method, an article, or equipment. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is an exemplary embodiment. Based on such an understanding, the technical solutions of this application essentially, or the part contributing to the related technology may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

The invention claimed is:

1. A non-connected-state uplink positioning method, performed by a terminal device, comprising:
   receiving first configuration information from a network device when the terminal device is in a connected state with the network device, wherein the first configuration information indicates a first preset area, wherein the first configuration information indicates a first uplink positioning resource used for the terminal device to send a first uplink positioning signal after the terminal device changes to a non-connected state from the connected state, wherein the first uplink positioning resource is valid for the terminal device sending the first uplink positioning signal in the non-connected state when the terminal device is in the first preset area, wherein the first uplink positioning signal includes location related measurement information;
   after the terminal device enters the non-connected state while within the first preset area, sending the first uplink positioning signal previously saved in the connected state via the first uplink positioning resource to positioning devices, for determining location of the terminal device; and
   when it is detected that the terminal device is moved out of the first preset area but within coverage of the network device, establishing a Radio Resource Control (RRC) connection with the network device, determining an uplink positioning signal of the terminal device, and saving the uplink positioning signal.

2. The non-connected-state uplink positioning method according to claim 1, wherein the first preset area comprises one cell or one group of cells.

3. The non-connected-state uplink positioning method according to claim 1, wherein after a positioning process in the connected state ends, the non-connected-state uplink positioning method further comprises:
   receiving second configuration information after moving in a second preset area from the network device when the terminal device is in the connected state, wherein the second configuration information indicates a second uplink positioning resource used for the terminal device to send a second uplink positioning signal after the terminal device in the second preset area changes to the non-connected state from the connected state; and
   after the terminal device enters the non-connected state, sending the second uplink positioning signal via the second uplink positioning resource.

4. The non-connected-state uplink positioning method according to claim 1, wherein after a positioning process in the connected state ends, the non-connected-state uplink positioning method further comprises:
   releasing, by the terminal device, the first uplink positioning resource.

5. The non-connected-state uplink positioning method according to claim 3, wherein after the sending a second uplink positioning signal via the second uplink positioning resource, the non-connected-state uplink positioning method further comprises:
   when it is detected that the terminal device is moved out of the second preset area, establishing an RRC connection with the network device and determining a location of the terminal device in the connected state.

6. The non-connected-state uplink positioning method according to claim 1, wherein after the sending the first uplink positioning signal via the first uplink positioning resource, the non-connected-state uplink positioning method further comprises:
   establishing the RRC connection with the network device and determining the location of the terminal device in the connected state, when the network device fails to receive the first uplink positioning signal and initiates the RRC connection.

7. The non-connected-state uplink positioning method according to claim 6, wherein after a positioning process in the connected state ends, the non-connected-state uplink positioning method further comprises:
   receiving third configuration information from the network device when the terminal device is in the connected state, wherein the third configuration information indicates a third uplink positioning resource used for the terminal device to send a third uplink positioning signal after the terminal device changes to the non-connected state from the connected state; and
   after the terminal device enters the non-connected state, sending the third uplink positioning signal via the third uplink positioning resource.

8. The non-connected-state uplink positioning method according to claim 6, wherein after a positioning process in the connected state ends, the non-connected-state uplink positioning method further comprises:
   releasing, by the terminal device, the first uplink positioning resource.

9. The non-connected-state uplink positioning method according to claim 1, wherein the first configuration information is sent by the network device, the positioning server determines that the terminal device supports non-connected-state uplink positioning, and before the receiving first configuration information, the non-connected-state uplink positioning method further comprises:
   receiving capability request information; and
   sending capability information, wherein the capability information is used by the positioning server for determining whether the terminal device supports non-connected-state uplink positioning.

10. The non-connected-state uplink positioning method according to claim 9, wherein the uplink positioning resources are periodic.

11. A terminal device, comprising a memory, a processor, and a computer program stored in the memory and executable on the processor, wherein the computer program, when executed by the processor, causes the processor to:
   receive first configuration information from a network device when the terminal device is in a connected state with the network device, wherein the first configuration information indicates a first preset area, wherein the first configuration information indicates a first uplink positioning resource used for the terminal device to send a first uplink positioning signal after the terminal device changes to a non-connected state from the connected state, wherein the first uplink positioning resource is valid for the terminal device sending the first uplink positioning signal in the non-connected state when the terminal device is in the first preset area, wherein the first uplink positioning signal includes location related measurement information;

after the terminal device enters the non-connected state while within the first preset area, send the first uplink positioning signal previously saved in the connected state via the first uplink positioning resource to positioning devices, for determining a location of the terminal device; and when it is detected that the terminal device is moved out of the first preset area but within coverage of the network device, establish a Radio Resource Control (RRC) connection with the network device, determine an uplink positioning signal of the terminal device, and save the uplink positioning signal.

12. The terminal device according to claim 11, wherein the first preset area comprises one cell or one group of cells.

13. The terminal device according to claim 11, wherein after the positioning process in the connected state ends, the processor is further configured to:

receive second configuration information after moving in a second preset area from the network device when the terminal device is in the connected state, wherein the second configuration information indicates a second uplink positioning resource used for the terminal device to send a second uplink positioning signal after the terminal device in the second preset area changes to the non-connected state from the connected state; and after the terminal device enters the non-connected state, send the second uplink positioning signal via the second uplink positioning resource.

14. The terminal device according to claim 13, wherein after sending the second uplink positioning signal via the second uplink positioning resource, the processor is further configured to:

when it is detected that the terminal device is moved out of the second preset area, establish an RRC connection with the network device and determine a location of the terminal device in the connected state.

15. The terminal device according to claim 11, wherein after the positioning process in the connected state ends, the processor is further configured to:

release the first uplink positioning resource.

16. The terminal device according to claim 11, wherein after sending the first uplink positioning signal via the first uplink positioning resource, the processor is further configured to:

establish the RRC connection with the network device and determine the location of the terminal device in the connected state, when the network device fails to receive the first uplink positioning signal and initiates the RRC connection.

17. The terminal device according to claim 16, wherein after the positioning process in the connected state ends, the processor is further configured to:

receive third configuration information from the network device when the terminal device is in the connected state, wherein the third configuration information indicates a third uplink positioning resource used for the terminal device to send a third uplink positioning signal after the terminal device changes to the non-connected state from the connected state; and after the terminal device enters the non-connected state, send the third uplink positioning signal via the third uplink positioning resource.

18. A non-transitory computer-readable storage medium, wherein the computer-readable storage medium stores a computer program, and when the computer program is executed by a processor, causes the processor to:

receive first configuration information from a network device when the terminal device is in a connected state with the network device, wherein the first configuration information indicates a first preset area, wherein the first configuration information indicates a first uplink positioning resource used for the terminal device to send a first uplink positioning signal after the terminal device changes to a non-connected state from the connected state, wherein the first uplink positioning resource is valid for the terminal device sending the first uplink positioning signal in the non-connected state when the terminal device is in the first preset area, wherein the first uplink positioning signal includes location related measurement information;

after the terminal device enters the non-connected state while within the first preset area, send the first uplink positioning signal previously saved in the connected state via the first uplink positioning resource to positioning devices, for determining a location of the terminal device;

when it is detected that the terminal device is moved out of the first preset area but within coverage of the network device, establish a Radio Resource Control (RRC) connection with the network device, determine an uplink positioning signal of the terminal device, and save the uplink positioning signal.

* * * * *